United States Patent [19]

Yamauchi et al.

[11] Patent Number: 5,208,679
[45] Date of Patent: May 4, 1993

[54] APPARATUS FOR REPRODUCING INFORMATION IN RESPONSE TO SELECTED IMAGE CHANGE CONTROL INFORMATION

[75] Inventors: Keiichi Yamauchi; Toshihiko Shimizu; Satomi Sudo, all of Kawagoe, Japan

[73] Assignee: Pioneer Electronic Corporation, Tokyo, Japan

[21] Appl. No.: 725,128

[22] Filed: Jul. 2, 1991

[30] Foreign Application Priority Data

Jul. 6, 1990 [JP] Japan .................................. 2-179795

[51] Int. Cl.⁵ .............................................. G11B 7/00
[52] U.S. Cl. .................................... 358/342; 358/335; 358/343
[58] Field of Search .............. 358/310, 311, 335, 341, 358/342, 343, 401, 909, 403, 327, 339, 143, 22, 182, 183; 360/19.1, 27, 32, 33.1, 35.1, 14.1, 13, 15.1, 14.3

[56] References Cited

U.S. PATENT DOCUMENTS

| | | | |
|---|---|---|---|
| 4,630,231 | 12/1986 | Hirata et al. | 364/900 |
| 4,833,548 | 5/1989 | Watanabe | 358/342 |
| 4,858,012 | 8/1989 | Himo et al. | 358/210 |
| 4,873,586 | 10/1989 | Ishikawa et al. | 358/342 |
| 4,956,726 | 9/1990 | Takimoto et al. | 360/27 |
| 5,107,343 | 4/1992 | Kawai | 358/341 |

Primary Examiner—Tommy P. Chin
Assistant Examiner—Robert Chevalier
Attorney, Agent, or Firm—Sughrue, Mion, Zinn, Macpeak & Seas

[57] ABSTRACT

An information reproducing apparatus reproduces information from an information storage medium such as a CD-ROM which has a storage area divided into a plurality of sections, for storing digital audio information and digital image information which includes a plurality of image change control information and picture information. The information reproducing apparatus has a controller for selecting one of the image change control information to control the picture information during a transition period thereof.

15 Claims, 13 Drawing Sheets

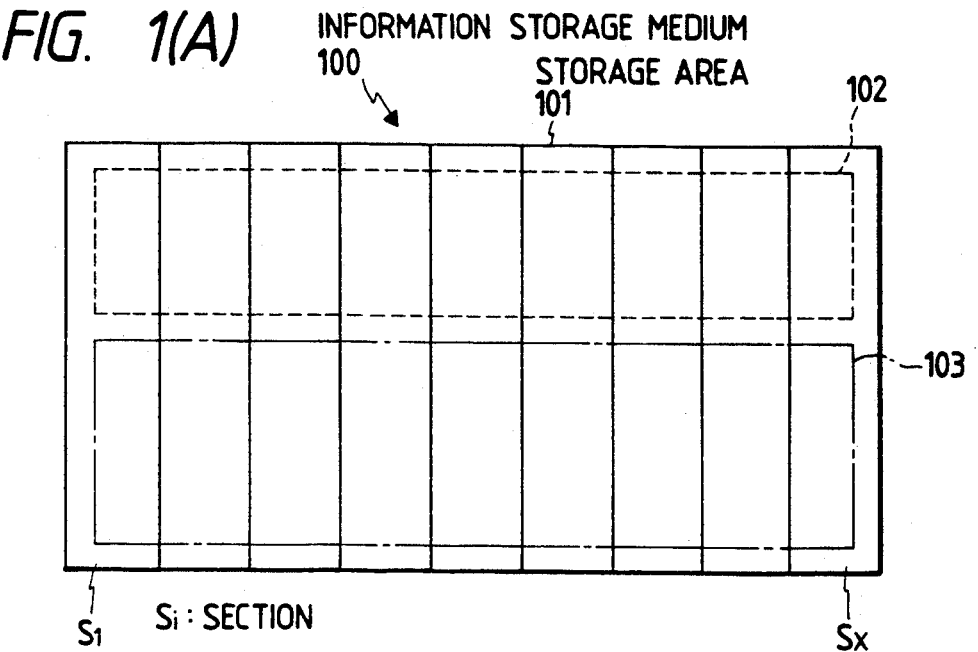
FIG. 1(A)
- 100: INFORMATION STORAGE MEDIUM
- 101: STORAGE AREA
- $S_i$ : SECTION
- 102: DIGITAL AUDIO INFORMATION
- 103: DIGITAL IMAGE INFORMATION
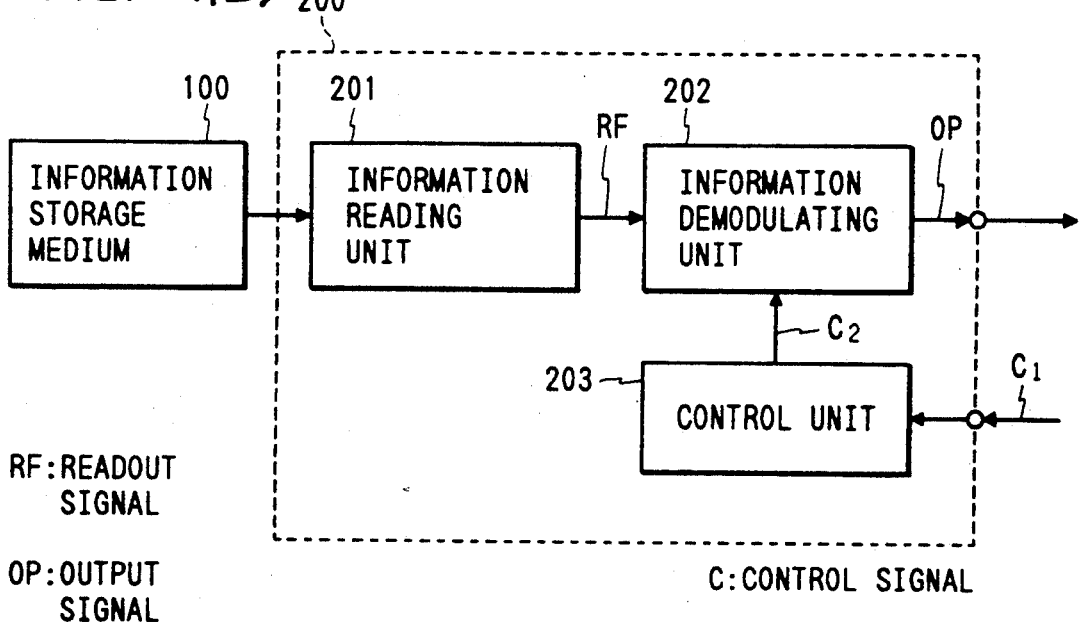
FIG. 1(B) INFORMATION REPRODUCING APPARATUS 200
RF: READOUT SIGNAL
OP: OUTPUT SIGNAL
C: CONTROL SIGNAL

FIG. 4

| SOUND QUALITY LEVEL | TYPE | SAMPLING FREQUENCY (kHz) | QUANTIZING NUMBER (BIT) | BIT REDUCTION RATIO (STEREO/MONO) | AUDIO CHARACTERISTICS | |
|---|---|---|---|---|---|---|
| | | | | | DYNAMIC RANGE (dB) | FREQUENCY RANGE (kHz) |
| CD DIGITAL AUDIO (SOUND QUALITY CORRESPONDING TO PRESENT 16-BIT PCM) | PCM | 44.1 | 16 | 1 | 98 | 20 |
| A  HIFI (SOUND QUALITY CORRESPONDING TO LP RECORD) | ADPCM | 37.8 | 8 | 1/2 / 1/4 | 90 | 17 |
| B  MID-HIFI (SOUND QUALITY CORRESPONDING TO FM BROADCAST) | ADPCM | 37.8 | 4 | 1/4 / 1/8 | 90 | 17 |
| C  SPEECH (SOUND QUALITY CORRESPONDING TO AM BROADCAST) | ADPCM | 18.9 | 4 | 1/8 / 1/16 | 50 | 8.5 |

APPARATUS FOR REPRODUCING INFORMATION IN RESPONSE TO SELECTED IMAGE CHANGE CONTROL INFORMATION

BACKGROUND OF THE INVENTION

The present invention relates to an apparatus for reproducing information, and more particularly to an information reproducing apparatus for playing back musical accompaniments, so-called "karaoke", and reproducing images.

A conventional apparatus for playing back prerecorded musical accompaniments or a musical accompaniment playback apparatus, reproduces such prerecorded musical accompaniment by playing back information recording mediums, such as magnetic tapes, video disks, etc., on which only musical accompaniments are recorded. Such a musical accompaniment playback apparatus includes an amplifier connected to a microphone and a loudspeaker, and mixes vocal signal supplied from the microphone with signals of reproduced musical accompaniments, amplifies the mixed signals, and supplies the amplified signals to the loudspeaker to produce audible sounds.

There are known audio-visual musical accompaniment playback apparatus capable to reproducing musical accompaniments stored in video disks (VD) or compact disks (CD) and, while at the same time, displaying image on graphic display units.

The known audio-visual accompaniment playback apparatus does not display anything special but displays a normal image when a musical accompaniment is started or ended. If a displayed image changed somehow during a transition period of displayed image information, i.e., upon starting or ending of a musical accompaniment, it would be effective to create a good atmosphere for the starting or ending of the singing performance.

SUMMARY OF THE INVENTION

It is an object of the present invention to provide an information reproducing apparatus which is capable of changing images during a transition period of displayed image information.

According to one aspect of the present invention, there is provided an apparatus for reproducing information from an information storage medium having a storage area divided into a plurality of sections, for storing digital audio information and digital image information which includes a plurality of image change control information and picture information, comprising information reading means for reading information from the information storage medium, information demodulating means for demodulating the information read by the information reading means and outputting the demodulated information, and control means for selecting one of the image change control information to control the picture information outputted from the information demodulating means, during a transition period of the picture information. The information storage medium may include an optical disk according to Adaptive Differential Pulse Code Modulation system. The digital audio information may include song accompaniment information. The apparatus may further comprise information displaying means for displaying the digital image information, command input means for inputting command to select one of the image change control information, accoustoelectric transducer for transducing voice sound sung in relation to the song accompaniment information into electric voice information, and information mixing means for mixing the song accompaniment information with the electric voice information. The information storage medium may include an optical storage disk according to Adaptive Differential Pulse Code Modulation system. The image change control information may include information for fading in an image displayed by the information displaying means and information for fading out an image displayed by the information displaying means. The information displaying means may include a screen and the image change control information may include information for causing an image displayed by the information displaying means to appear on the screen in time with a motion in which the screen is wiped and information for causing an image displayed by the information displaying means to disappear from the screen in time with a motion in which the screen is wiped.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 1(A) and 1(B) are diagrams illustrating a first embodiment of the present invention, respectively.

FIG. 4 is a diagram showing a table of ADPCM sound quality levels and audio characteristics.

FIGS. 12(A), 12(B), 12(C) through 19(A), 19(B), 19(C) are diagrams showing, by way example, changing images displayed on an image display unit during operation of the musical accompaniment playback apparatus.

DETAILED DESCRIPTION OF THE PREFERRED EMBODIMENTS

First Embodiment

Figure 2:
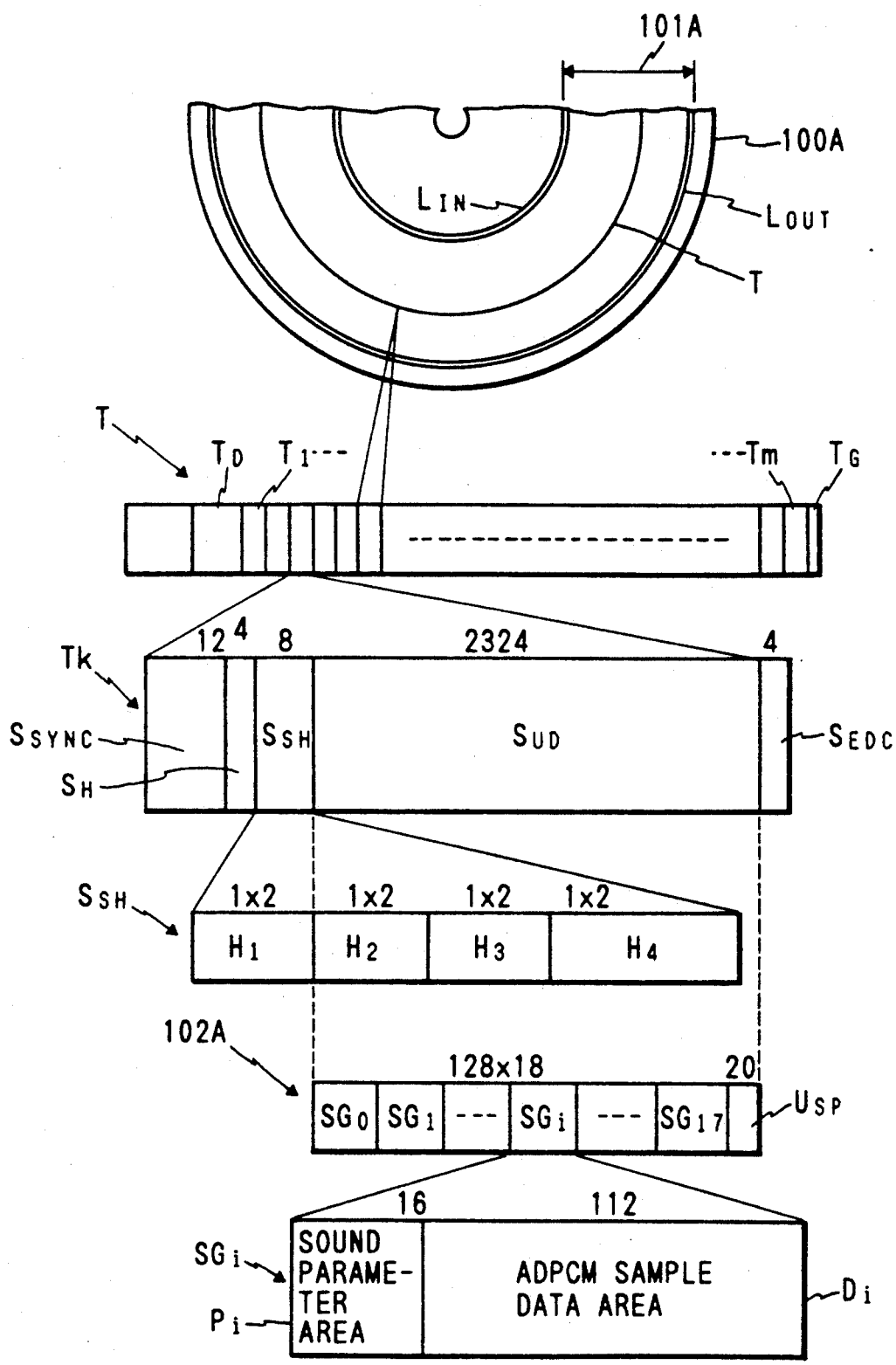
FIG. 2 is a diagram showing a data structure of digital audio information stored in a CD-ROMXA disk as an information storage medium used in a second embodiment of the present invention.

FIGS. 1(A) and 1(B) schematically show a first embodiment of the present invention.

FIG. 1(A) shows an information storage medium 100 for use in the first embodiment of the present invention, the information storage medium 100 having a storage area 101. The storage area 101 is divided into a plurality of sections $S_1$-$S_x$. The storage area 101 store digital audio information 102 and digital image information 103. The digital image information includes a plurality of image change control information and picture information (not shown).

As shown in FIG. 1(B), the information storage medium 100 is played back by an information reproducing apparatus 200 which comprises an information reading unit 201, an information demodulating unit 202, and a control unit 203.

When the information storage medium 100 is played back to reproduce information stored in the storage area 101, the digital audio information 102 and the digital image information 103 can be reproduced. In the information reproducing apparatus 200, the information reading unit 201 reads information from the information storage medium 100 and outputs the read information as a readout signal RF. The information demodulating unit 202 receives the readout signal RF as an input signal, demodulates the input signal, and outputs the demodulated signal as an output signal OP. The control unit 203 outputs a control signal $C_2$ for controlling demodulating and outputting operation of the information demodulating unit 202 in response to an external control signal $C_1$ or according to a program stored therein, in order to select one of the image change control information as an image to be displayed during a transition period of the picture information which is to be outputted. In response to the control signal $C_2$, the information demodulating unit 202 demodulates one of the image change control information as an image to be displayed during a transition period of the picture information.

Second Embodiment

FIG. 2 shows a data structure of an information storage medium used in a second embodiment of the present invention which is in the form of a CD-ROMXA disk.

A CD-ROM is an information storage medium that employs a compact disk (CD), which has been established as a digital audio disk, as a ROM (read-only memory) for only reading stored digital information. Standards for CD-ROMs were established in 1985. CD-ROMs are finding widespread use in various applications, and are advantageous in that they provide a very large storage capacity, are highly reliable as they operate optically, can access desired information quickly, are available in a large number of duplicates, and can establish an inexpensive reproduction system.

Information storage mediums which employ a format based on the CD-ROM include a CD-I (CD-Interactive) and a CD-ROMXA. Both can record and reproduce voice sound/audio information and image information, which are modulated according to ADPCM (Adaptive Differential Pulse Code Modulation) (see Nikkei Electronics, May 15, 1989, pages 195-200).

The data/sector structure of a storage area for storing audio information in a CD-ROMXA is illustrated in FIG. 2.

According to the CD signal format, 98 frames of subcodes are handled as one block, and one block corresponds to 1/75 second. Since $$44.1 \times 10^3 \times 16 \times 2 \times 1/75 \times \tfrac{1}{2} = 2352,$$

data represented by 2352 bytes can be recorded in one block on a CD. In the above equation, $44.1 \times 10^3$ indicates a sampling frequency, 16 a quantizing number, 2 left and right channels (L and R) of a sterophonic system, 1/75 time (second), and $\tfrac{1}{2}$ a conversion rate between bits and bytes.

On the CD-ROMXA disk, each block is referred to as a sector, and user data are recorded in each sector. There are two standards, Mode 2 for CD-ROMXA disks depending on the size of the user data area, etc. and there are two standards, Form 1 and Form 2 for Mode 2. In a storage area 101A of the CD-ROMXA disk, a volume descriptor is stored in Mode 1, and image information and voice sound information is stored in Form 2 for Mode 2.

As shown in FIG. 2, the CD-ROMXA disk, designated by 100A, has lead-in tracks $L_{IN}$, a storage area 101A, and lead-out tracks $L_{OUT}$. In the storage area 101A, each track T has a volume descriptor $T_D$, sectors $T_1$-$T_m$, and a gap $T_G$. The volume descriptor $T_D$ is an area for storing an identification code indicating the CD-ROMXA disk, a flag, a start-up directory, etc., and is recorded in Mode 1 or Mode 2 Form 1. The sectors $T_1$-$T_m$ (e.g., $T_k$) store image and voice sound or audio signals, and are recorded in Mode 2 Form 2, and each contains a synchronizing signal $S_{SYNC}$, a header $S_H$, a subheader $S_{SH}$, user data $S_{UD}$, and an error detecting code $S_{EDC}$. The synchronizing signal $S_{SYNC}$ is composed of 12 bytes, and serves to distinguish sectors. The header $S_H$ is composed of 4 bytes, three for storing address information similar to the subcodes for CDs, and one for storing mode information. The subheader $S_{SH}$ is composed of 8 bytes, and includes a final number $H_1$, a channel number $H_2$, a submode $H_3$, and a coding formation $H_4$. Each of these items $H_1$-$H_4$ is composed of 1 byte, and is written twice (i.e., repeated twice).

The user data $S_{UD}$ is composed of 2324 bytes in Form 2 and has sound groups $SG_o$-$SG_n$ and a spare unit $U_{SP}$. In FIG. 2, each of the sound groups $SG_o$-$SG_n$ is composed of 128 bytes, and the spare unit $U_{SP}$ is composed of 20 bytes. Therefore, there is a total of 18 sound groups in the illustrated embodiment. The sound groups $SG_0$-$SG_{17}$ are composed of a total of 2304 bytes. The voice sound signal is encoded by ADPCM and recorded in these sound groups $SG_0$-$SG_{17}$. The error detecting code $S_{EDC}$ is composed of 4 bytes.

Figure 3:
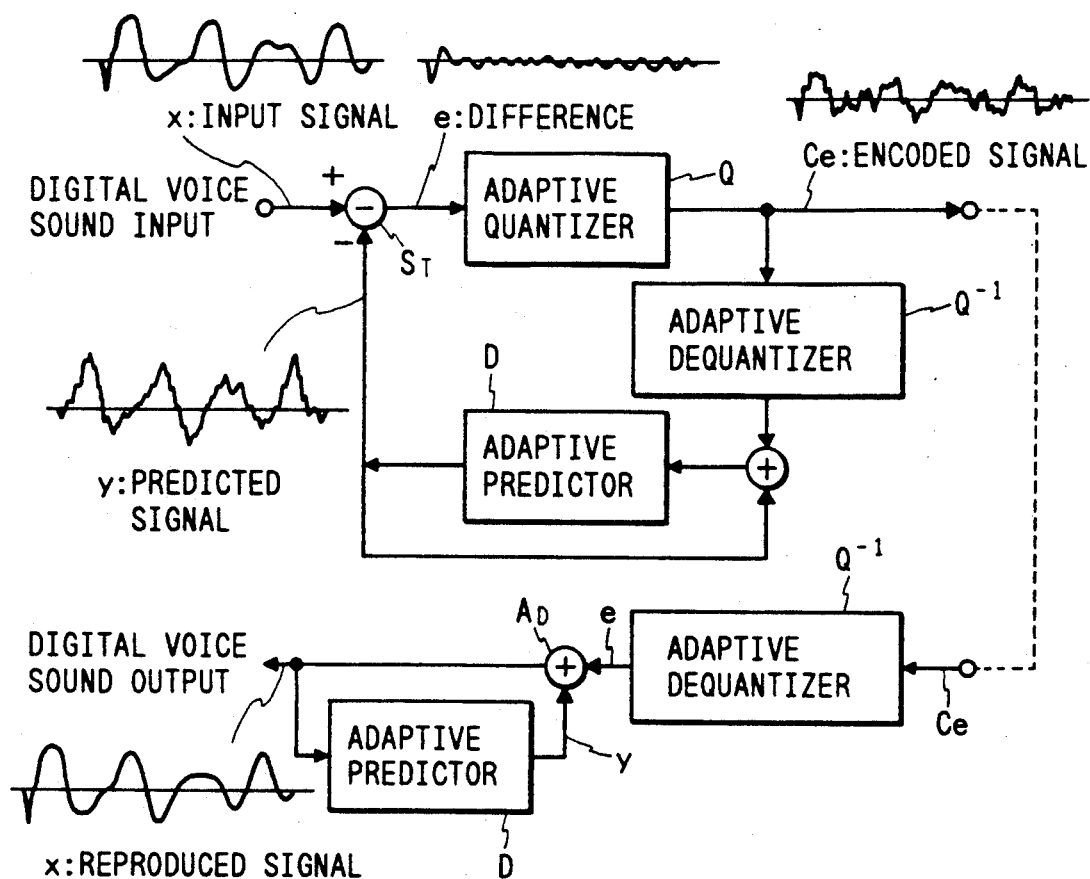
FIG. 3 is a diagram showing a table of ADPCM sound system.

FIG. 3 shows the principles of an ADPCM system. A modulation is carried out as follows. A present input signal is predicted from a past input signal by an adaptive predictor D, and the difference e $(=x-y)$ between the predicted signal y and a present input signal x is calculated by a subtractor $S_T$. Then, the difference e is quantized with a plurality of bits and encoded into a coded signal $C_e$ by an adaptive quantizer Q. A demodulation process is carried out in a manner which is the reversal of the above mentioned process. More specifically, the coded signal $C_e$ is decoded back to the difference e by an adaptive dequantizer $A^{-1}$. Then, the predicted signal y from the adaptive predictor D and difference e are added into an output signal x by an adder $A_D$.

The ADPCM system allows audio data to be recorded efficiently with a smaller number of bits. Audio characteristics vary depending on the bit reduction ratio (data compression ratio). FIG. 4 shows the relationship between ADPCM sound quality levels and audio characteristics. It can be seen from FIG. 4 that the bit reduction ratio in the sound quality level A is $\tfrac{1}{2}$ for sterophonic reproduction and $\tfrac{1}{4}$ for monaural reproduction, the bit reduction ratio in the sound quality level B is ¼ for sterophonic reproduction and ⅛ for monaural reproduction, and the bit reduction ratio in the sound quality level C is ⅛ for sterophonic reproduction and 1/16 for monaural reproduction. If the bit reduction ratio is ¼, then the required storage capacity may be ¼ of the conventional storage capacity, and the remaining ¾ storage capacity may be used to store other data.

In FIG. 2, each sound group $SG_i$ is composed of 128 bytes, and has a sound parameter area $P_i$ and an ADPCM sample data area $D_i$. The sound parameter area $P_i$ has a storage capacity of 16 bytes, and stores a coefficient of a predictive filter in the adaptive predictor D shown in FIG. 4. The ADPCM sample data area $D_i$ has a storage capacity of 112 bytes, and stores data sampled by the ADPCM system. Therefore, one sector has an overall data storage capacity of 2016 bytes ($=112\times18$). If data are to be stored in the ADPCM sound quality level B for stereophonic reproduction, then 504 bytes will be required to store the data because $$37.8\times10^3\times4\times2\times1/75\times\tfrac{1}{4}=504.$$

Therefore, since $2016\div504=4$, data which are four times greater than the data possible with the conventional storage system can be stored. Stated otherwise, voice sound and audio signals for four channels can be stored. The first channel is stored in sectors $T_1, T_5, T_9, \ldots, T_{4h+1}$ (H is an integer of 0 or more). The second channel is stored in sectors $T_2, T_6, T_{10}, \ldots, T_{4h+2}$. The third channel is stored in sectors $T_3, T_7, T_{11}, \ldots, T_{4h+4}$. The fourth channel is stored in sectors $T_4, T_8, T_{12}, \ldots, T_{4h+4}$.

In this manner, musical accompaniments of karaoke music pieces are pulse-code-modulated and stored in the ADPCM sample data area $D_i$.

Figure 5:
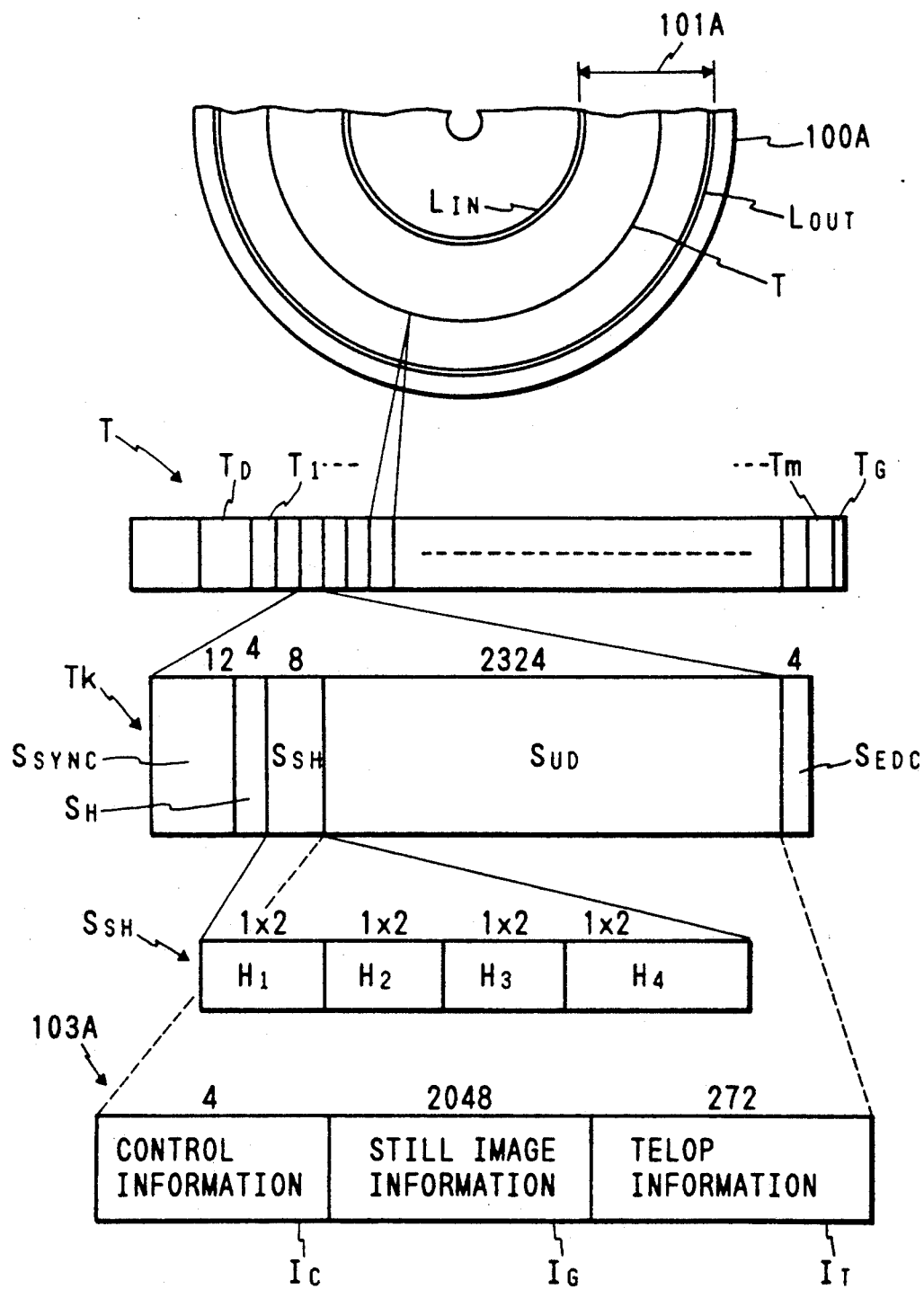
FIG. 5 is a diagram showing data structure of digital image information stored in the CD-ROMXA disk.

FIG. 5 shows, by way of example, a data structure of the digital image information 103A which is stored in the area of the user data $S_{UD}$ (2324 bytes). The user data $S_{UD}$ (2324 bytes) has control information $I_C$, still image information $I_G$, and telop (superimposed character) information $I_T$.

The control information $I_C$ is composed of 4 bytes, and provided for each sector, i.e., every 1/75 second. The control information $I_C$ is used to control the start of display of still images, the turning ON/OFF of telop information such as words of songs, and color changes of telop information. The still image information $I_G$ is composed of 2048 bytes, and contains information about still, that is, static, image and figures. The telop information $I_T$ is composed of 272 bytes, and stores character information about words of songs independently of still images and figures.

Figure 6:
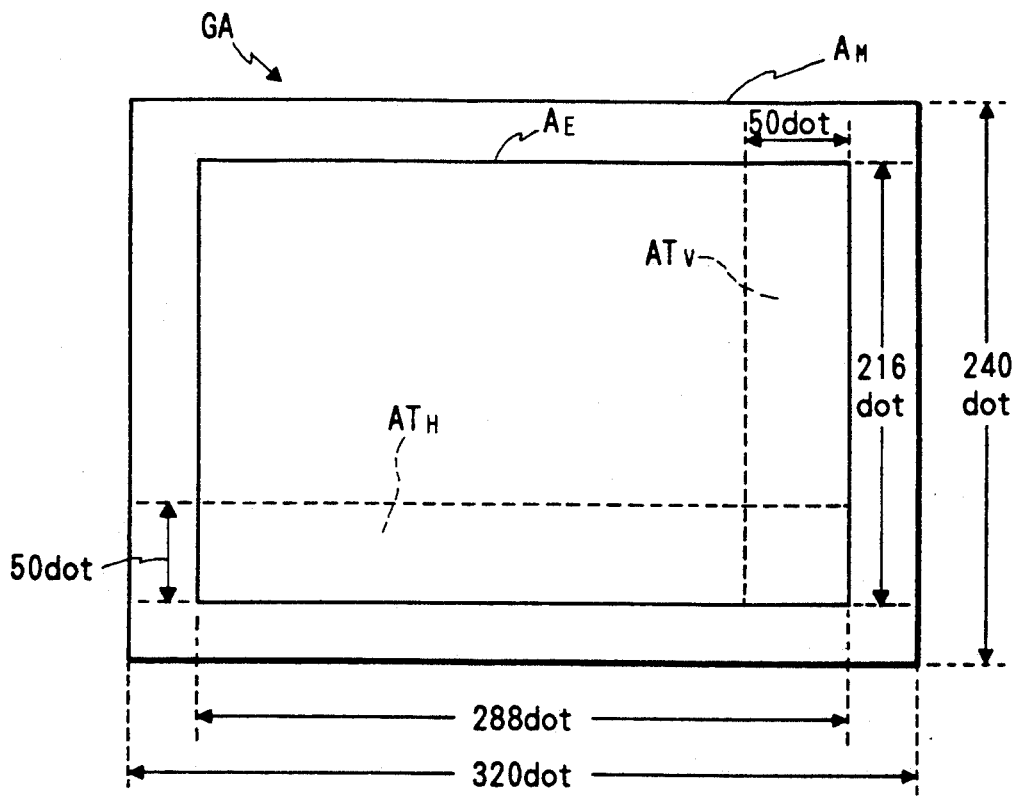
FIG. 6 is a view of a screen for displaying an image.

A display screen will be described below with reference to FIG. 6. A graphic display unit has a screen GA including a maximum screen range $A_M$ defined by 320 dots in a horizontal direction and 240 dots in a vertical direction, and is composed of a total of 76800 ($=320\times240$) pixels (picture elements). Actually, the graphic display unit employs, for image reproduction, an effective screen range $A_E$ which is smaller than the maximum screen range $A_M$. The effective screen range $A_E$ is defined by 288 bits in a horizontal direction and 216 dots in a vertical direction, and is composed of a total of 62208 ($=288\times216$) pixels. Control information of 8 bits (1 bytes) is needed to display one pixel. Therefore, still image information of 76800 bytes is necessary per screen frame to display an image on the maximum screen range $A_M$, and still image information of 62208 bytes is necessary per screen frame to display an image on the effective screen range $A_E$.

Telop information, which displays characters as of words of songs and figures relative to words of songs separately from still images, can be displayed horizontally in a horizontal display area $AT_H$ and vertically in a vertical display area $AT_V$. The horizontal display area $AT_H$ is defined by 288 dots in a horizontal direction and 50 dots in a vertical direction, and contains a total of 14400 ($=288\times50$) pixels. The vertical display area $AT_V$ is defined by 50 dots in a horizontal direction and 216 dots in a vertical direction, and contains a total of 10800 ($=50\times216$) pixels. To display one pixel of telop information, color information of 2 bits are required. Therefore, telop information of 28800 bits, i.e., 3600 bytes, is required to display a telop message in the horizontal display area $AT_H$, and telop information of 21600 bits, i.e., 2700 bytes, is required to display a telop message in the vertical display area $AT_V$.

Figure 7:
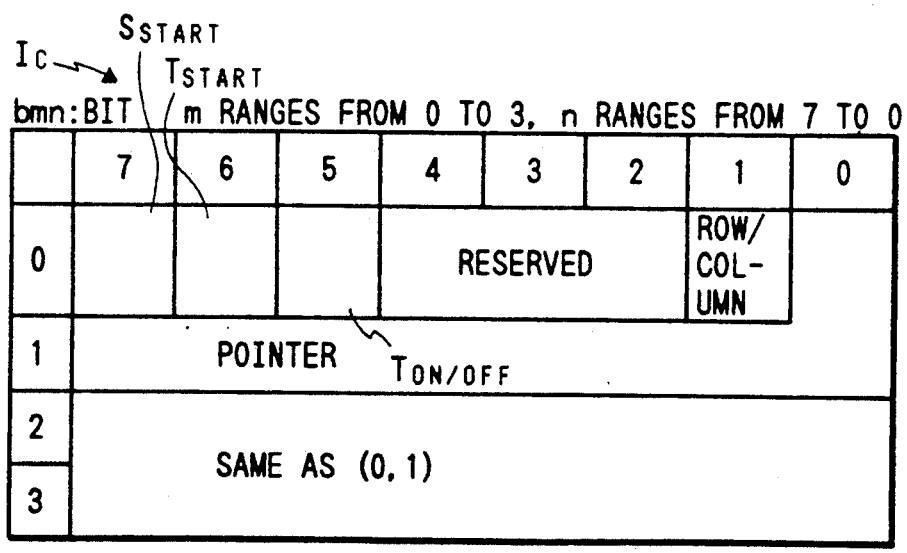
FIG. 7 is a diagram showing a data structure of control information shown in FIG. 5.

FIG. 7 shows a data structure of the control information $I_C$. The control information $I_C$ contains information of 4 bytes (32 bits), and is composed of twice written information (each 16 bits). Of the 16 bits, the first one bit $b_{07}$ is designated by $S_{START}$ and is information indicating the beginning of still image data. The next one bit $b_{04}$ is designated by $T_{START}$ and is information indicating the beginning of telop information. The next one bit $b_{05}$ is designated by $T_{ON/OFF}$ and is information for controlling the turning ON/OFF of telop information. The next one bit $b_{01}$ is information for controlling rows/columns of telop information. The nine bits $b_{00}$, $b_{10}$–$b_{17}$ are pointer information indicating the position where the telop message such as of words of songs varies changes in color.

Figure 8:
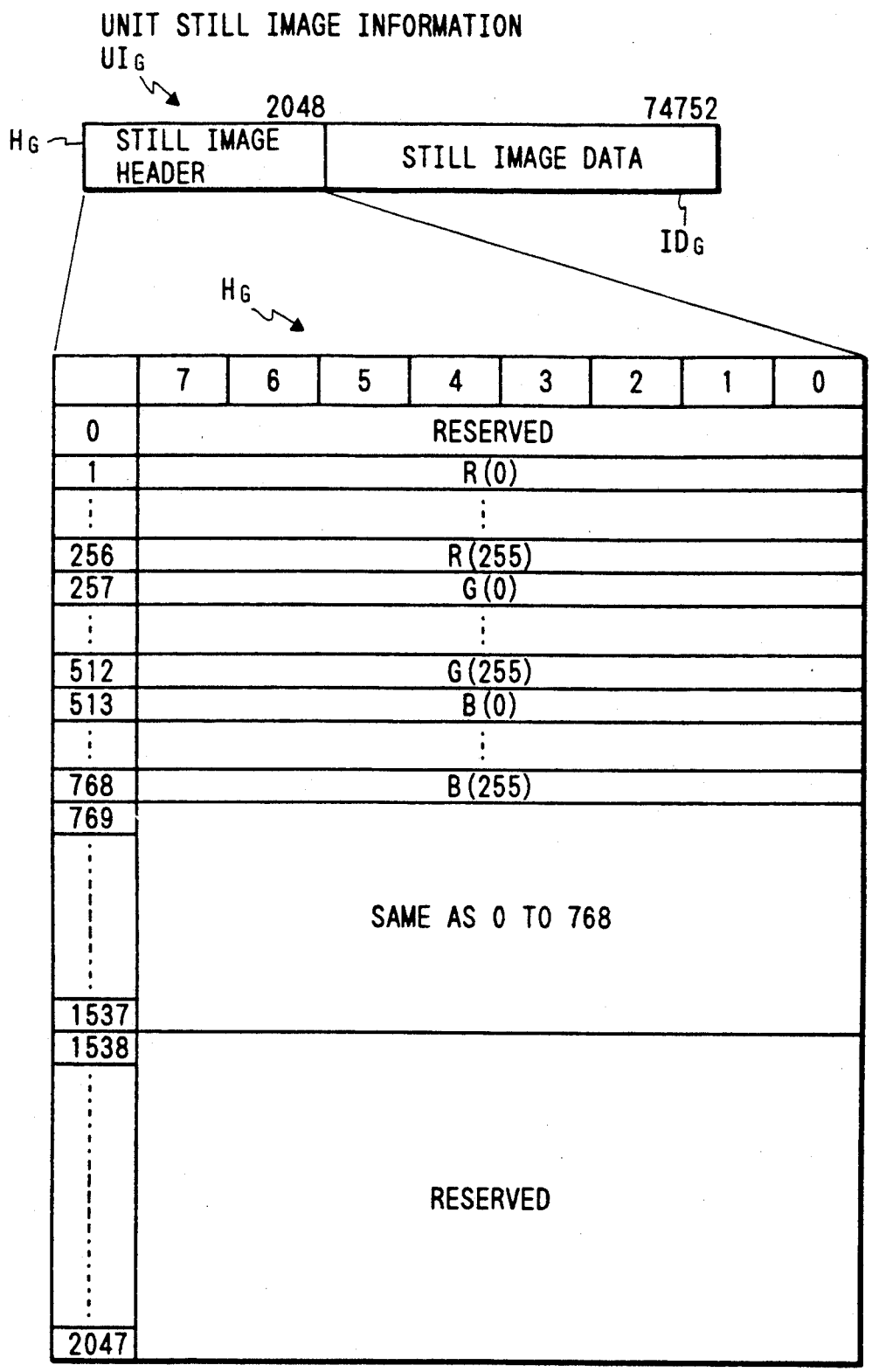
FIG. 8 is a diagram showing an arrangement of a unit still image information shown in FIG. 5.

FIG. 8 shows unit still image information $UI_G$ which is a collection of 37.5 sectors of the still image information 411 (2048 bytes) shown in FIG. 5. The unit still image information $UI_G$ is composed of 76800 bytes ($=2048\times37.5$) which are necessary to display one frame in the maximum screen range $A_M$ shown in FIG. 6. The still image information $UI_G$ has a still image header $H_G$ and still image data $ID_G$. The still image header $H_G$ is composed of 2048 bytes, and represents palette information for indicating colors to be displayed in pixels. The still image header $H_G$ is arranged as follows: As shown in FIG. 8, the first byte is reserved. Of the following 768 bytes, the first 256 bytes are palette information indicating 256 colors related to R (red), the next 256 bytes are palette information indicating 256 colors related to G (green), and the final 256 bytes are palette information indicating 256 colors related to B (blue). The next 769 ($=1+3\times256$) bytes are information which is identical to the above 769 bytes. The final bytes 510 are reserved. Part of the palette information is allotted to the display of telop information. The still image data $ID_G$ are composed of 74752 bytes, and store control information relative to brightness or the like that is necessary to display pixels other than colors.

Figure 9:
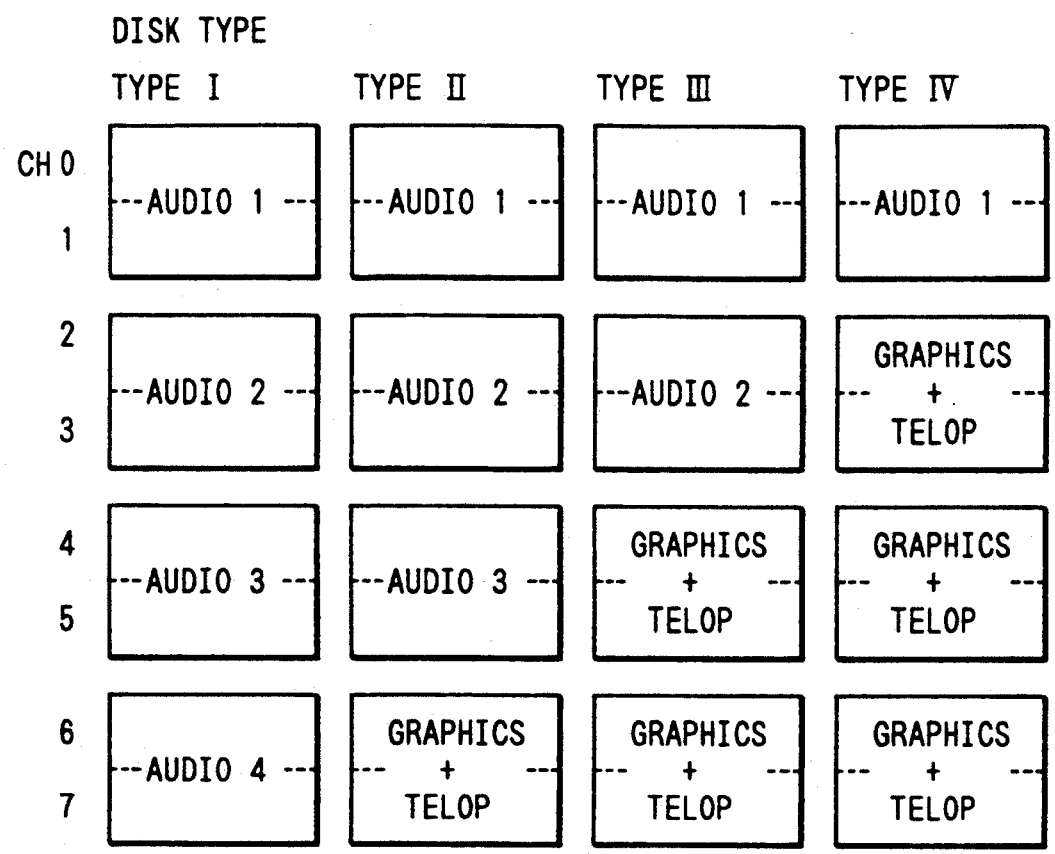
FIG. 9 is a diagram showing, by way of example, types in which digital audio information and digital image information are stored.

As described above, digital audio information and digital image information are stored in the CD-ROMXA disk 11. FIG. 9 shows, by way of example, types in which digital audio information and digital image information are stored. In Type I four channels are all assigned to digital audio information. Type I corresponds to the storage of data in the sound quality level B for sterophonic reproduction in each channel according to the ADPCM system. In Type II, three out of four channels are assigned to digital audio information, and the remaining one channel is assigned to digital image information. Therefore, 18.75 sectors (75×¼) of information are allotted to the display of an image per second. Since 37.5 sectors of information are necessary in order to display one frame of image, two seconds are required to complete one frame of image because $37.5 \div 18.75 = 2$. In Type III, two channels are assigned to digital audio information, and two channels are assigned to digital image information. Inasmuch as 37.5 sectors of information are assigned to the display of an image per second, as described above, one frame of image is completed in one second because $37.5 \div 37.5 = 1$. In type VI, one channel is assigned to digital audio information, and three channels (56.25 sectors) are assigned to digital image information. Thus, one frame of image can be displayed in 0.67 second because $37.5 \div 56.25 = 0.67$.

Figure 10:
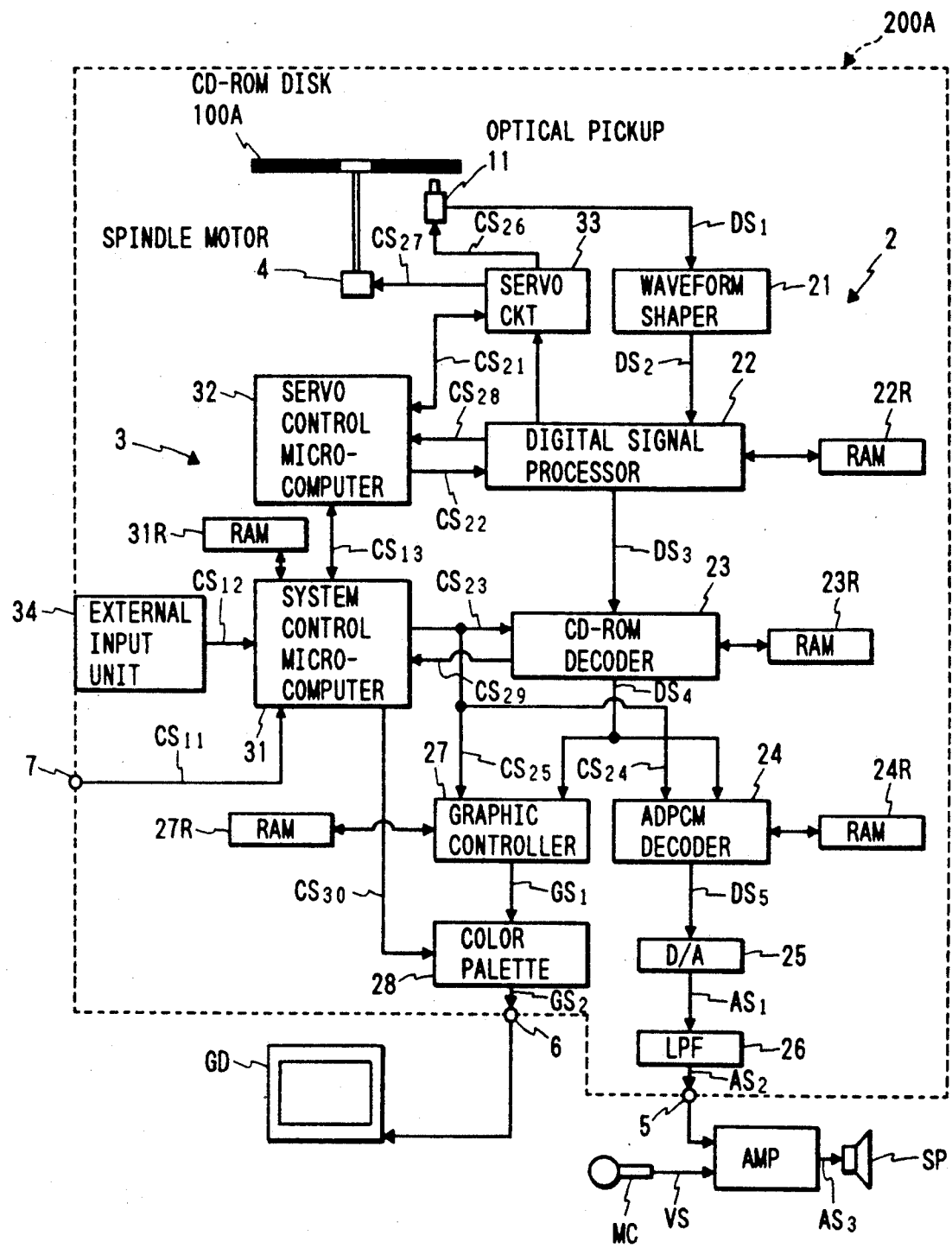
FIG. 10 is a block diagram of a karaoke or musical accompaniment playback apparatus as an apparatus for reproducing information according to a second embodiment of the present invention.

FIG. 10 show in block form an apparatus for reproducing information according to a second embodiment of the present invention. The information reproducing apparatus shown in FIG. 10 is incorporated in a karaoke or musical accompaniment playback apparatus 501.

As shown in FIG. 10, the musical accompaniment playback apparatus 200A, as a second embodiment of the present invention, comprises an optical pickup 11 as a means for reading information, a demodulator block 2, a control block 3 as a control means, a spindle motor 4, and external terminals 5, 6, 7.

The demodulator block 2 has a waveform shaper 21, a digital signal processor 22, a RAM (random access memory) 22R, a CD-ROM decoder 23, a RAM 23R, an ADPCM decoder 24, a RAM 24R, a D/A converter 25, a low-pass filter 26, a graphic controller 27, a RAM 27R, and a color palette 28.

The control block 3 comprises a system control microcomputer 31, a RAM 31R, a servo control microcomputer 32, a servo circuit 33, and an external input unit 34.

An external amplifier AMP may be connected to the external terminal 5, and an external microphone MC and an external loudspeaker SP may be connected to the external amplifier AMP. A graphic display unit GD may be connected to the external terminal 6. An external control unit such as a microcomputer may be coupled to the external terminal 7.

The musical accompaniment playback apparatus 200A operates as follows:

A CD-ROM disk 100A is rotated about its own axis by the spindle motor 4. The optical pickup 11 reads a digital signal represented by a sequence of pits from the recording surface of the CD-ROM disk 100A. The digital signal, designated by $DS_1$, read by the optical pickup 11 is supplied to the waveform shaper 21 by which the waveform of the digital signal is shaped. The shaped digital signal is then applied as a digital signal $DS_2$ to the digital signal processor 22. In the digital signal processor 22, the edges of an EFM signal are detected, using a reference clock signal generated by a quartz crystal oscillator, thereby reproducing a sequence of data. From the reproduced sequence of data, there is detected a frame synchronizing signal, based on which the structure of frame data is exactly reproduced. The frame data are converted into 8-bit symbol data by EFM demodulation, and written into the RAM 22R. The data stored in the RAM 22R are then deinterleaved. Thereafter, an error correcting process is effected on the data. The corrected data are then sent as a signal $DS_3$ from the digital signal processor 22 to the CD-ROM decoder 23. In the CD-ROM decoder 23, addresses are sought according to the absolute time of the subcode, synchronizing signal in the data are detected, and the data are unscrambled. Then, the header address is checked, and a desired sector is accessed. The user data which are obtained are subjected to error detection and correction processes, after which the corrected data are supplied as a signal $DS_4$ to the ADPCM decoder 24.

The ADPCM decoder 24 has an adaptive dequantizer and an adaptive predictor (not shown), and demodulates the signal $DS_4$ into a digital signal and supplies the demodulated signal as a signal $DS_5$ to the D/A converter 25.

The D/A converter 25 converts the demodulated signal $DS_5$ into an analog signal, and sends the analog signal as a signal $AS_1$ to the low-pass filter 26. The low-pass filter 26 processes the signal $AS_1$ into an accurate signal $AS_2$ and applies the signal $AS_2$ to the external terminal 5.

The analog signal $AS_2$, which is an audio output signal from the musical accompaniment playback apparatus 200A, is applied to the external amplifier AMP. Voice sounds applied to the external microphone MC are converted thereby into a microphone voice signal VS. The external amplifier AMP adjusts the frequency characteristics of the analog signal $AS_2$ and also mixes the analog signal $AS_2$ with the microphone voice signal VS. Then, the external amplifier AMP amplifies the mixed signal to a suitable level, and then sends the amplified signal as a signal $AS_3$ to the external loudspeaker SP. The external loudspeaker SP converts the signal $AS_3$ into audible sounds which are radiated from the external loudspeaker SP.

The signal $DS_4$ outputted from the CD-ROM decoder 23 is also transmitted to the graphic controller 27. In cases where image information is stored in the user data $S_{UD}$ of the CD-ROM disk 100A, the graphic controller 27 extracts an image signal representing the image information contained in the signal $DS_4$, and outputs the extracted image signal as a graphic signal $GS_1$. The graphic signal $GS_1$ is then supplied to the color palette 28. The color palette 28 adjusts or adds the color represented by the graphic signal $GS_1$, and outputs it as a graphic signal $GS_2$ to the external terminal 6. The graphic signal $GS_2$, which is an image output signal from the musical accompaniment playback apparatus 200A, is applied to the graphic display unit GD. The graphic display unit GD displays an image represented by the graphic signal $GS_2$.

The system control microcomputer 31 applies a control signal $CS_{13}$ to the servo control microcomputer 32 according to control signal $CS_{12}$ supplied from the external input unit 34, a control signal $CS_{11}$ supplied from the external terminal 7, or a control program stored in the system control microcomputer 31. The system control microcomputer 31 also controls the CD-ROM decoder 23, the ADPCM decoder 24, the graphic controller 27, and the color palette 28 with respective control signals $CS_{23}$, $CS_{24}$, $CS_{25}$, $CS_{30}$. The system control microcomputer 31 receives FILE-TOC data as a control signal $CS_{29}$ from the CD-ROM decoder 23, and stores the data in the RAM 31R. The FILE-TOC data is stored as the user data $S_{UD}$ in the CD-ROMXA disk, ahead of the digital audio information 102A and the digital image information 103A, and represents an information table relative to the contents of the digital audio information 102A and the digital image information 103A. The servo control microcomputer 32 receives the control signal $CS_{13}$ from the system control microcomputer 31, and also receives a subcode signal $CS_{28}$ from the digital signal processor 22. The servo control microcomputer 32 controls the digital signal processor 82 and the servo circuit 33 with respective control signals $CS_{22}, CS_{21}$. The servo circuit 33 is responsive to the control signal $CS_{21}$ from the servo control microcomputer 32 to control the optical pickup 11 and the spindle motor with respective control signals $CS_{26}, CS_{27}$.

Operation of the musical accompaniment playback apparatus 200A which is loaded with the CD-ROM disk 100A will now be described below with reference to FIGS. 10 and 11(A) through 11(D).

Figure 11A:
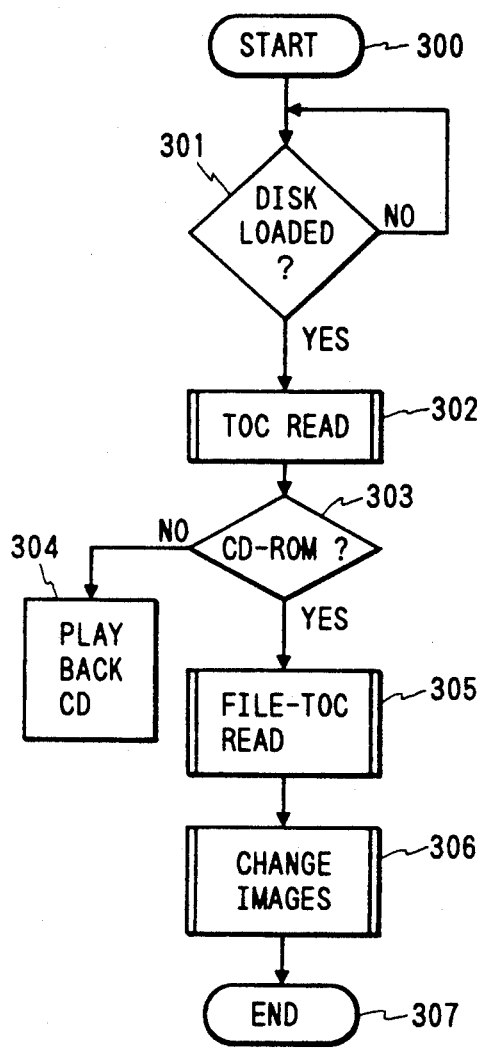
FIGS. 11(A) through 11(D) are flowcharts of control programs for controlling operation of the musical accompaniment playback apparatus shown in FIG. 10, respectively.

As shown in FIG. 11(A), the musical accompaniment playback apparatus 200A starts to operate at a step 300, and then determines whether a disk is loaded or not in a step 301. If a disk is loaded, then control goes from the step 301 to a step 302 which is a subroutine for reading a TOC stored in the lead-in tracks of the loaded disk. After the step 302, the step 303 determines whether the loaded disk is an ordinary CD or a CD-ROM. If the loaded disk is an ordinary loaded disk, then control goes to a step 304 in which the loaded disk is played back. If the loaded disk is a CD-ROM, then control proceeds to a step 305 which is a subroutine for reading the FILE-TOC data from the FILE-TOC of the disk. After the step 305, control goes to a step 30 which is a subroutine for changing and reproducing images during a transition period of displayed image information. The sequence shown in FIG. 11(A) ends at a step 307.

Figure 11B:
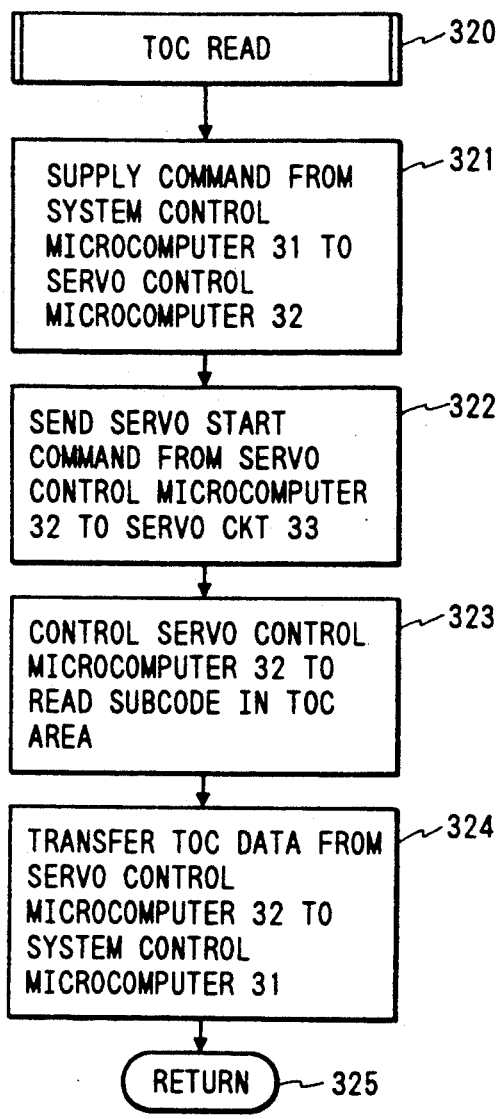

The subroutine in the step 302 for reading the TOC is started in a step 230 in FIG. 11(B). In a step 321, a command signal is applied to the servo control microcomputer 32 from the system control microcomputer 31 to supply a servo operation start command from the servo control microcomputer 32 to the servo circuit 33 in a step 322, thus controlling the optical pickup 11 for tracking under servo control. Then, the servo control microcomputer 32 reads subcodes in the TOC area on the lead-in tracks of the CD-ROM disk 100A in a step 323. The TOC data is transferred from the servo control microcomputer 32 to the system control microcomputer 31 in a step 324. The subroutine shown in FIG. 11(B) is finished in a step 325.

Figure 11C:
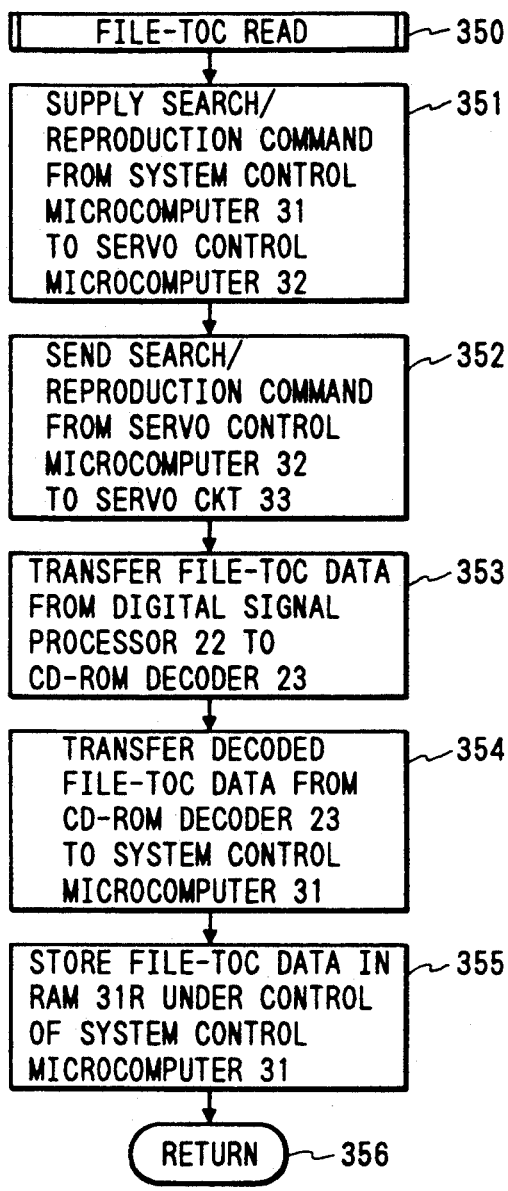

The subroutine in the step 305 for reading the FILE-TOC data is started in a step 350 in FIG. 11(C). A search/reproduction command is applied to the servo control microcomputer 32 from the system control microcomputer 31 in a step 351. Then, the servo control microcomputer 32 applies a search/reproduction command to the servo circuit 33 in a step 352. The digital signal processor 22 transfers the FILE-TOC data to the CD-ROM decoder 23 in a step 353. The CD-ROM decoder 23 decodes the FILE-TOC data, and the decoded FILE-TOC data are transferred from the CD-ROM decoder 23 to the system control microcomputer 31 in a step 354. The system control microcomputer 31 stores the transferred FILE-TOC data in the RAM 31R in a step 355. The subroutine shown in FIG. 11(C) is brought to an end in a step 356.

Figure 11D:
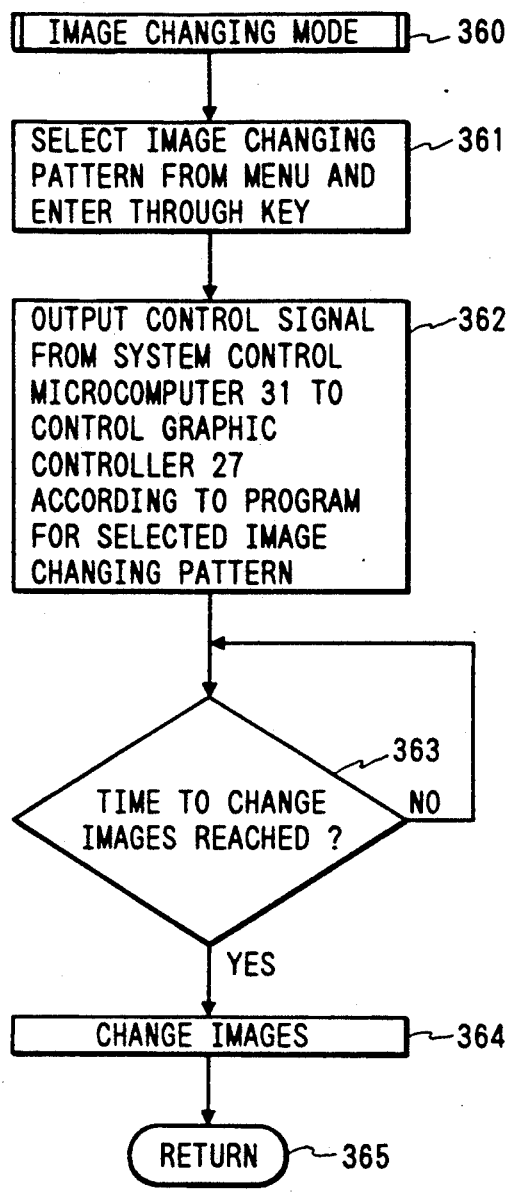

The subroutine in the step 306 will be described below with reference to FIG. 11(D). After the subroutine is started in a step 360, a desired image changing pattern which corresponds to image change control information is selected from a menu of different image changing patterns displayed on the screen, and entered through a key in a step 361. In a step 362, the system control microcomputer 31 outputs a control signal $CS_{25}$ to control the graphic controller 27 according to a control program corresponding to the selected image changing pattern. A step 363 determines whether a time for changes is reached or not. If reached, then the image is changed with the selected image changing pattern in a step 364. The sequence shown in FIG. 11(D) ends in a step 365.

Different image changing the patterns for changing image displayed when the CD-ROM disk 100A is loaded in and played back by the musical accompaniment playback apparatus 200A will be described below with reference to FIGS. 12(A), 12(B) 12(C) through 19(A), 19(B), 19(C).

Figure 12A:
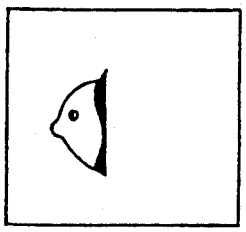
Figure 12B:
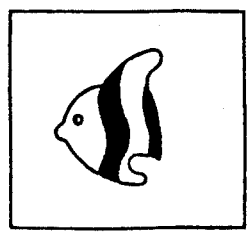
Figure 12C:
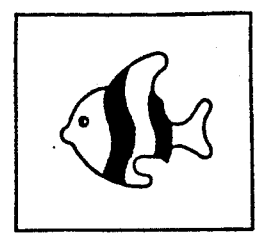

In FIGS. 12(A), 12(B), 12(C), an image is displayed progressively from the left in the order from FIG. 12(A) to 12(B) to FIG. 12(C) in an image changing pattern called "WIPE". Conversely, a displayed image may be erased progressively in the order from FIG. 12(C) to FIG. 12(B) to FIG. 12(A).

Figure 13A:
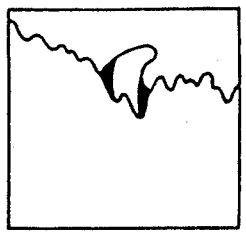
Figure 13B:
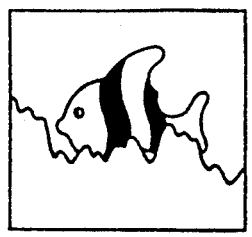
Figure 13C:
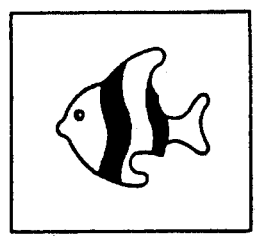

In FIGS. 13(A), 13(B), 13(C), an image is displayed progressively from above in the order from FIG. 13(A) to FIG. 13(B) to FIG. 13(C). Conversely, a displayed image may be erased progressively in the order from FIG. 13(C) to FIG. 13(B) to FIG. 13(A).

Figure 14A:
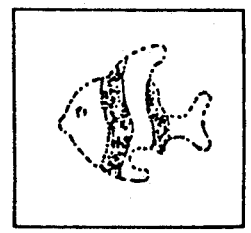
Figure 14B:
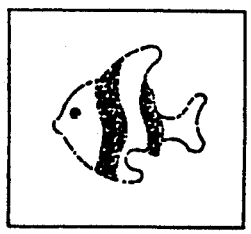
Figure 14C:
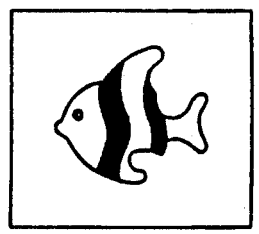

In FIGS. 14(A), 14(B), 14(C), an image is displayed progressively in an image changing pattern known as "FADE-IN". Alternatively, a displayed image may be erased in an image changing pattern known as "FADE-OUT".

Figure 15A:
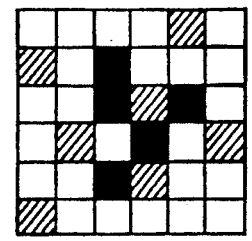
Figure 15B:
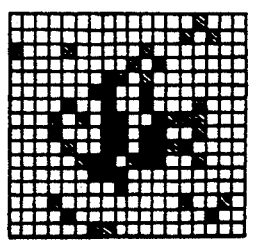
Figure 15C:
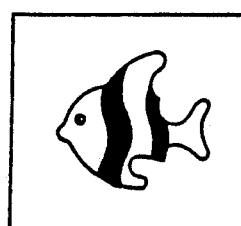

FIGS. 15(A), 15(B), 15(C) show an image changing pattern in which a mosaic pattern becomes finer progressively in the order from FIG. 15(A) to FIG. 15(B) to FIG. 15(C) when a sharp complete image is displayed. A displayed image may be erased in a reverse image changing pattern in which a mosaic pattern becomes coarser progressively.

Figure 16A:
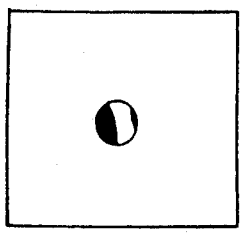
Figure 16B:
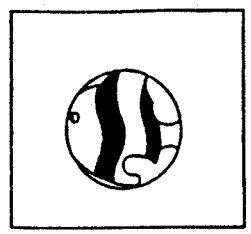
Figure 16C:
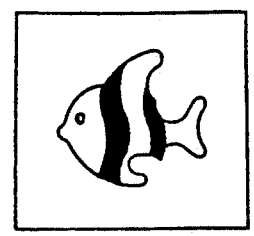

FIGS. 16(A), 16(B), 16(C) show an image changing pattern in which an image is displayed through a central circular window that becomes greater progressively in the order from FIG. 16(A) to FIG. 16(B) when a complete image is displayed. A displayed image may be erased in a reverse image changing pattern which has a central circular window that becomes smaller progressively.

Figure 17A:
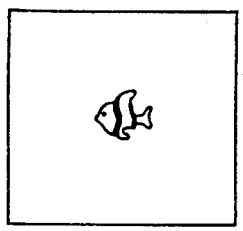
Figure 17B:
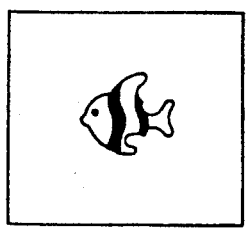
Figure 17C:
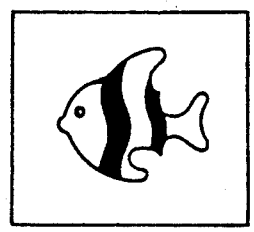

FIGS. 17(A), 17(B), 17(C) show an image changing pattern in which a displayed image becomes greater progressively in the order from FIG. 17(A) to FIG. 17(B) to FIG. 17(C) until it reaches a desired size. Conversely, a displayed image may disappear while its size becomes smaller progressively.

Figure 18A:
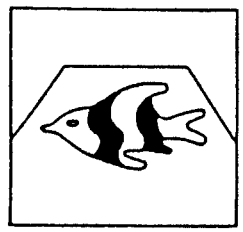
Figure 18B:
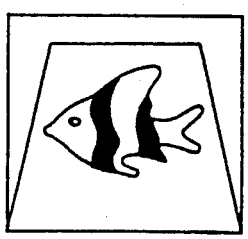
Figure 18C:
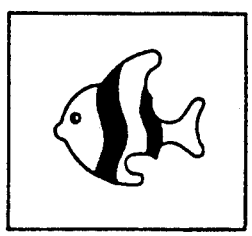

In FIGS. 18(A), 18(B), 18(C), an image is raised progressively in the order from FIG. 18(A) to FIG. 18(B) to FIG. 18(C) until it is fully displayed. A displayed image may be erased by falling over progressively in a reverse image changing pattern.

Figure 19A:
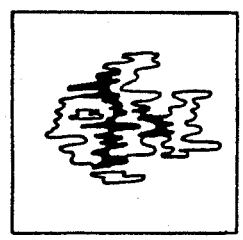
Figure 19B:
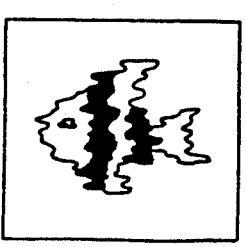
Figure 19C:
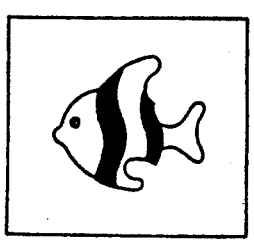

In an image changing pattern shown in FIGS. 19(A), 19(B), 19(C), an image is displayed progressively more clearly from an obscure image that looks like reflections from a wavy water surface, in the order from FIG. 19(A) to FIG. 19(B) to FIG. 19(C). Conversely, a displayed image may dissolve into an obscure image in a reverse image changing pattern.

In the above embodiment, images change according to a selected image changing pattern during a transition period of displayed image information such as at the starting or ending of the image information, but may change while a music accompaniment is being played back.

The CD-ROMXA disk has been employed as the information storage medium in the above embodiment. However, the information storage medium may be of any of various other forms including a CD-ROM, a CD-I, an ordinary CD, a DAT (digital audio tape), an IC card, and a read-only memory of another type.

With embodiments of the present invention, as described above, the musical accompaniment playback apparatus can e controlled to change images in an image changing pattern during a transition period of displayed image information.

Since the information storage medium is a digital information storage medium such as a CD-ROMXA, an ordinary CD, or the like, the data stored in the information storage medium can be accused in a short period of time.

The invention may be embodied in other specific forms without departing from the spirit of essential characteristics thereof, The present embodiment is therefore to be considered in all respect as illustrative and not restrictive, the scope of the invention being indicated by the appended claims rather than by the foregoing description and all changes which come within the meaning and range of equivalency of the claims are therefore intended to be embraced therein.

What is claimed is:

1. In an apparatus for reproducing information from an information storage medium having a storage area divided into a plurality of sections, for storing digital audio information and digital image information including a plurality of image change information and picture information, comprising:
    information reading means for reading information from said information storage medium;
    information demodulating means for demodulating the information read by said information reading means and outputting as demodulated information at least said image change control information and said picture information;
    transition period detecting means for detecting a starting portion and an ending portion of said demodulated picture information; and
    control means for selecting said image change control information to control said picture information output by said information demodulating means, so as to permit control of said picture information during the transition period of said picture information.

2. An apparatus according to claim 1, wherein said information storage medium includes an optical disk according to Adaptive Differential Pulse Code Modulation system.

3. An apparatus according to claim 1, wherein said digital audio information includes song accompaniment information, said apparatus further comprising:
    information displaying means for displaying said digital image information;
    command input means for inputting command to select one of said image change control information;
    accoustoelectric transducer means for transducing voice sound snug in relation to said song accompaniment information into electric voice information; and
    information mixing means for mixing said song accompaniment information with said electric voice information.

4. An apparatus according to claim 3, wherein said information storage medium includes an optical storage disk according to Adaptive Differential Pulse Code Modulation system.

5. An apparatus according to claim 3, wherein said image control information includes information for fading in an image displayed by said information displaying means.

6. An apparatus according to claim 3, wherein said image change control information includes information for fading out an image displayed by said information displaying means.

7. An apparatus according to claim 3, wherein said information displaying means includes a screen and said image change control information includes information for causing an image displayed by said information displaying means to appear on said screen in time with a motion in which said screen is wiped.

8. An apparatus according to claim 3, wherein said information displaying means includes a screen and said image change control information includes information for causing an image displayed by said information displaying means to disappear from said screen in time with a motion in which said screen is wiped.

9. An apparatus for reproducing information from an information storage medium having a storage area divided into a plurality of sections, for storing digital audio information and digital image information, said digital image information including a plurality of image change control information and plural pieces of picture information, said apparatus comprising:
    information reading means for reading information from said information storage medium;
    information demodulating means for demodulating the information read by said information reading means and outputting demodulated information;
    command input means for inputting a command to select one of said image change control information and one piece of said picture information when said information from said information storage medium is reproduced;
    transition period detecting means for detecting a starting portion and an ending portion of said selected piece of picture information; and
    information reproducing means having a display means, for reproducing said selected picture information output by said information demodulating means on said display means in accordance with said selected image change control information during a transition period detected by said transition period detecting means.

10. An apparatus according to claim 9, wherein said digital audio information includes song accompaniment information, said apparatus further comprising:
    accoustoelectric transducer means for transducing voice sounds sung in relation to said song accompaniment information into electric voice information; and
    information mixing means for mixing said song accompaniment information with said electric voice information.

11. An apparatus according to claim 10, wherein said information storage medium includes an optical storage disk according to Adaptive Differential Pulse Code Modulation system.

12. An apparatus according to claim 10, wherein said image change control information includes information for fading in an image displayed by said information reproducing means.

13. An apparatus according to claim 10, wherein said image change control information includes information for fading out an image displayed by said information reproducing means.

14. An apparatus according to clam 10, wherein said information reproducing means includes a screen and said image change control information includes information for causing an image displayed by said information reproducing means to appear on said screen in time with a motion in which said screen is wiped.

15. An apparatus according to claim 10, wherein said information reproducing means includes a screen and said image change control information includes information for causing an image displayed by said information reproducing means to disappear from said screen in time with a motion in which said screen is wiped.

* * * * *